United States Patent [19]

Huling

[11] Patent Number: 4,669,761

[45] Date of Patent: Jun. 2, 1987

[54] TUBING FITTING

[75] Inventor: Robert G. Huling, Battle Creek, Mich.

[73] Assignee: Marshall Brass Company, Marshall, Mich.

[21] Appl. No.: 632,380

[22] Filed: Jul. 19, 1984

[51] Int. Cl.⁴ .............................................. F16L 25/00
[52] U.S. Cl. ................................. 285/330; 285/382.4; 285/393
[58] Field of Search .................... 285/382.4, 258, 330; 29/523, 507

[56] References Cited

U.S. PATENT DOCUMENTS

| | | | |
|---|---|---|---|
| 43,998 | 8/1864 | Ketchum | 285/382.4 X |
| 772,136 | 10/1904 | Dossert | 285/382.4 X |
| 1,488,128 | 3/1924 | MacDonald | 285/382.4 X |
| 1,738,915 | 12/1929 | Mueller | 285/382.4 X |
| 3,432,916 | 3/1969 | Fisher et al. | 285/382.4 X |
| 3,534,988 | 10/1970 | Lindsey | 285/382.4 X |
| 3,671,060 | 6/1972 | Kyburz | 285/382.4 X |

FOREIGN PATENT DOCUMENTS

| | | | |
|---|---|---|---|
| 149232 | 5/1950 | Australia | 285/258 |
| 2557628 | 7/1977 | Fed. Rep. of Germany | 285/382.4 |

Primary Examiner—Dave W. Arola
Attorney, Agent, or Firm—Price, Heneveld, Cooper, DeWitt & Litton

[57] ABSTRACT

A fitting for high pressure gas lines and the like includes a fitting member having an internal bore therethrough. The bore has a portion thereof with an acircular cross section in a plane normal to the axis of the bore. The fitting is connected to the end of the conduit tube by sliding the tube into the bore and forcibly inserting an expander member into the inside of the tube. The expander member diametrically enlarges the tube, pushing its wall outwardly against the acircular portion of the bore. The expander member has a central passage therethrough which aligns with the bore and thus permits gas to flow from the tube through the expander member and into a second fitting which is connected to the fitting member.

12 Claims, 12 Drawing Figures

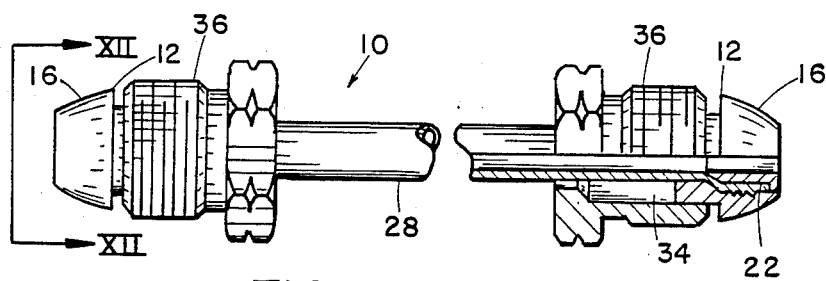
FIG 1
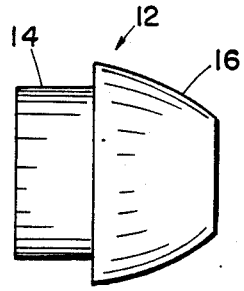
FIG 2
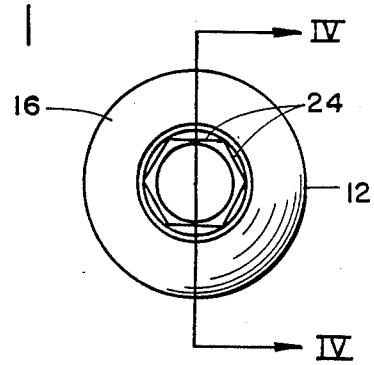
FIG 3
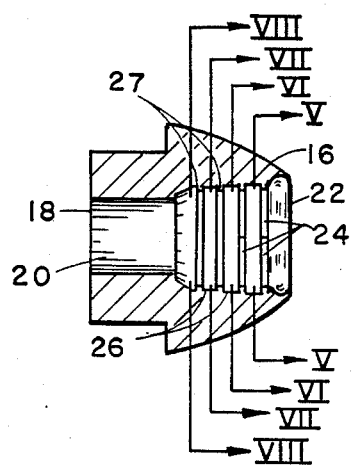
FIG 4
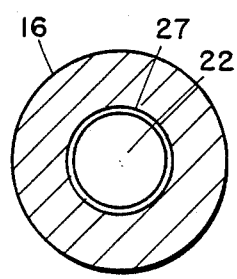
FIG 8
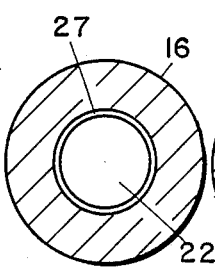
FIG 7
FIG 6    FIG 5
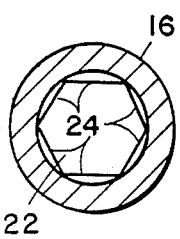
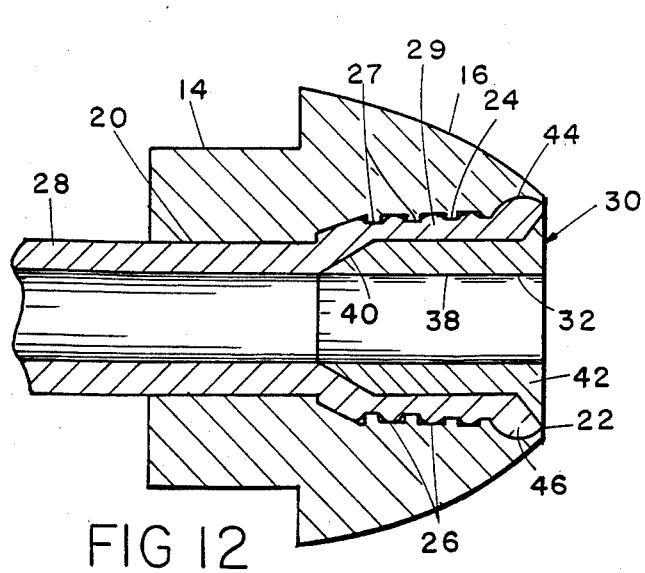
FIG 12
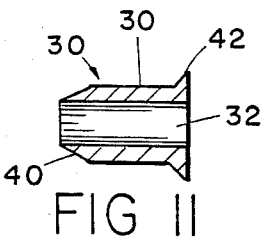
FIG 11
FIG 9    FIG 10
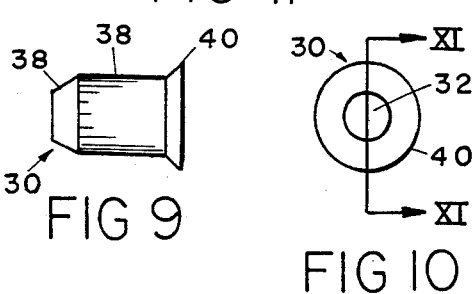

TUBING FITTING

BACKGROUND OF THE INVENTION

This invention relates to fittings for pressurized fluid lines, such as gas lines and the like, especially to fittings for natural gas and/or propane lines, for example fittings of the type commonly called "pigtail" fittings.

Pigtail fittings are a type of fitting used in the high pressure side of household, recreational, and light industrial gas lines, etc. For instance, a pigtail fitting is used to connect a propane tank valve to a regulator. A pigtail fitting usually has an elongated tube of soft metal (e.g., copper tubing) with at least one nipple-type fitting secured to an end thereof. The nipple has a bore therethrough which receives the tube. A left-hand-threaded nut is also provided to tighten the nipple into a matingly-configured fitting or receptacle on the tank valve or regulator. The dimensions and general nature of such fittings are standardized throughout the industry.

There a flammable gas, such as natural gas, is to be carried in the lines, it is critical that the fittings not only join together in a tight fashion but are also secured to the gas tubing such that the gas cannot leak around the fittings.

In order to accomplish such non-leaking connections, it has heretofore been deemed necessary to secure the fittings to the tubing by soldering them. This has been particularly the case with pigtail connectors because the elongated tube on which the fittings are mounted is usually curved, shaped, or looped (giving rise to the name "pigtail". If the nipple is not secured tightly to the tube, the nipple may twist on the tube when the tube is bent, ruining the gas-tight seal between the nipple and the tube, soldering has heretofore been the only practical way to secure the nipple to the tube to create a strong enough seal to resist such twisting.

Soldering fittings onto tubing is an onerous and time-consuming process, requiring that the surfaces to be soldered are first thoroughly cleaned, applying flux, joining the parts to be soldered, and heating the parts while carefully and accurately applying the solder to the joints. Such procedures are inevitably expensive when carried out as part of commercial manufacturing operations. This is true whether done by hand or by machine, since while machines can be used to heat and solder the parts automatically, such machines are expensive and require considerable manual feeding of parts, etc. Furthermore, if done either by hand or by machine, soldering is an energy-intensive and, therefore, costly process.

Soldering processes also require that the soldered assembly be cleaned after manufacture and prior to sale, because the soldering process scorches and discolors the product. Typically, such cleaning involves use of an acid both containing a strong acid, such as chromic acid. Such acids pose disposal problems inasmuch as they cannot be dumped into sewers, injected into the ground, or introduced into watercourses. Acid cleaning also requires expensive machinery to be an efficient operation. Such equipment contributes greatly to the cost of the finished article.

There has been at least one proposed alternative to soldering fittings of the type under consideration. This alternative proposed a special pigtail fitting having a nipple whose bore, which telescopically receives the tube, has several spaced, parallel, annular grooves. The tubing, made from a soft material, such as copper, is inserted into the bore and swaged outwardly against the annular grooves by a removable swaging tool, such that the outside surface of the tube is made to conform tightly to the grooved configuration of the nipple bore. The soft metal of the tube, at least theoretically, cold flows into the grooves during swaging, such that a gas-tight seal is created between the fitting and the tube.

In practice, however, it has been found that such fittings, when swaged as described do not maintain a gastight seal, particularly over a period of time. Such a fitting is usually provided with a threaded collar or nut immediately adjacent the nipple for connecting it to another fitting on a meter or pressure regulator. The collar normally turns independently of the fitting and threadably connects with the threaded sleeve on the other fitting. When turned by a wrench, it thus forces the grooved nipple into its matingly-configured receptacle, as described above.

Because the connector nut is in direct contact (abutment) with one end of the nipple, torque is applied to the latter when the nut or collar is turned. Accordingly, there is a strong tendency for the nipple to rotate on the tube with the nut, and this destroys the gas-tight seal since the tight contact between the fitting and the tube is weakened, the structural strength of the swaged material causing adhesion between the grooved surfaces of the bore and outside surfaces of the tube being insufficient to resist the turning of the fitting on the tube due to the torque applied to the nut. When the gas-tight seal is broken, of course, gas escapes from the system around the fitting, creating a fire and explosion hazard.

SUMMARY OF THE INVENTION

The present invention is a fitting for high-pressure gas lines which includes as a first component, a fitting member (e.g., a nipple) with a bore therethrough which receives the end of a first tube, the tube to be connected to a high-pressure source or outlet of gas. The bore in the fitting member has at least one portion thereof with an acircular cross section in a plane normal to the axis of the bore. The invention further includes an expander member which has outside dimensions larger than the inside dimensions of the tube, and which is inserted into the end of the tube with the latter positioned inside the fitting member, to thereby force the tube end to expand outwardly tightly against the acircular portion of the fitting bore. The expander member has a bore therethrough which allows gas to flow from the tube through the expander member and out the end of the fitting.

The expander member maintains the outside surfaces of the end of the tube tightly compressed against the inside of the acircular portion of the bore. This results in a very tight seal between the fitting member and the tube such that gas cannot escape around the fitting. Furthermore, because an acircular cross section portion is provided, the tube cannot rotate relative to the fitting member as a nut is turned to tighten the fitting member into a matingly-configured receptacle or fitting member to effect a gas-tight seal between the two fitting members.

The fitting of the present invention thus eliminates having to use solder and flux in the manufacture of pigtail fittings, and by so doing provides a number of significant manufacturing advantages, with attendant realization of substantial cost-savings as well as increased reliability and safety in use and performance.

BRIEF DESCRIPTION OF THE DRAWINGS

FIG. 1 is a fragmentary side elevation of a pigtail connector of the present invention shown partly in cross section;

FIG. 2 is a side elevation of a nipple fitting of the present invention;

FIG. 3 is a front elevation of the nipple shown in FIG. 2;

FIG. 4 is a cross section taken along the plane IV—IV of FIG. 3;

FIG. 5 is a cross section taken along the plane V—V of FIG. 4;

FIG. 6 is a cross section taken along the plane VI—VI of FIG. 4;

FIG. 7 is a cross section taken along the plane VII—VII of FIG. 4;

FIG. 8 is a cross section taken along the plane VIII—VIII of FIG. 4;

FIG. 9 is an enlarged side elevation of an expander member used in combination with the nipple of the present invention;

FIG. 10 is a front elevation of the expander in FIG. 9;

FIG. 11 is a cross section taken along the plane XI—XI of FIG. 10; and

FIG. 12 is an enlarged central sectional side elevation of the apparatus shown in FIG. 1.

DETAILED DESCRIPTION OF THE PREFERRED EMBODIMENTS

Referring first to FIG. 1, a pigtail connector 10 embodying the teachings of the present invention includes a pair of fitting members or nipples 12, one at each end of a tube 28. A nut 34 is provided for each nipple 12. Each nipple has a shank portion 14 (FIG. 2) and a nose portion 16 which is configured so as to be received within a matingly-configured fitting or receptacle on a high-pressure valve or pressure regulator. Nipple 12 has a bore or passage 18 therethrough, along its longitudinal axis (FIG. 1). Bore 18 has a narrow diameter portion 20 generally within shank 14 and an enlarged, belled-out cavity portion 22 generally within nose 16. Enlarged portion 2 has two sets of annular hexagonally-shaped projections 24 (FIGS. 5 and 6) arranged circumferentially along the inside peripheral surface thereof. Two circumferential grooves 26 are machined into enlarged cavity portion 22, creating annular rings 27 in enlarged portion 22 (FIGS. 7 and 8).

Nipple 12 is secured to a tube 28 by introducing the end of tube 28 through the shank end of bore 14 until the end of the tube is flush with the other end of bore 14 in nose portion 16. An expander member 30 which has exterior dimensions larger than the inside diameter of tube 28 is forced into the end of tube 28, expanding the end of tube 28 outwardly at 29 against the inside surfaces of the cylindrically-enlarged cavity portion 22 (FIG. 12). In this procedure, the outside surfaces of the end of tube 28 are made to flow outwardly into grooves 26 and around projections 24, such that the outside surfaces of tube 28 are forced into exact conformity with these grooves and projections. Expander member 30 has a bore 32 (FIG. 11) extending axially therethrough which establishes communication between the inside of tube 28 and the end of the pigtail fitting. Expander member 30 remains in position within the expanded end 29 of tube 28, inside enlarged cavity portion 22, to keep the expanded end of the tube in tight, radial compression against the inside of nipple 12.

Nipple 12 has standard external dimensions. The external dimensions of nose 16, for instance, are set according to industry standards to fit into matingly-configured standardized fittings on pressure regulators, meters and pressurized tanks from any manufacturer.

The outside diameter and length of shank 14 are also standardized to fit into the bore 34 (FIG. 1) of a standard left-handed threaded nut 36, the size and dimensions of which nut are also standard in the industry. Nut 34 mates with a threaded collar around the fitting which is adapted to receive nipple 12. Thus, when nut 36 is tightened within the threaded collar, nipple 12 will be urged tightly into the matingly-configured fitting on the pressure regulator or the like.

The narrow diameter portion 20 of bore 18 through nipple 12 has an inside diameter substantially equal to the outside diameter of tube 28. This, however, does not create a gas-tight seal between the fitting and the tube.

The enlarged cavity portion 22 of bore 18 inside the nose portion 16 of nipple 12 has a plurality of projections 24. Projections 24 in the preferred embodiment, as shown in FIGS. 1, 3 and 4–6, are disposed in two axially adjacent annular rows, each forming a hexagon (FIGS. 3, 5 and 6). When expander 30 forces the end of tube 28 outwardly against projections 24, the projections 24 desirably embed into and indent the outside of tube 28. Projections 24, therefore, lock into and grip these indentations to prevent the nipple from turning on the tube as nut 36 is tightened into the threaded collar during connection of the fittings.

If only circularly-shaped grooves were provided within enlarged portion 29, the gas-tight connection between the inside surfaces of enlarged cavity portion 22 and the outside surfaces of expanded portion 29 would eventually weaken, since over time, the nut is turned into and out of the threaded collar many times for replacement or refilling of the gas tank. With such circular grooves, the turning of nut 36 eventually causes nipple 12 to turn on tube 28, shearing the gas-tight seal created between these surfaces as a result of the outward force of expander 30.

In accordance with the present invention, however, the projections 24 present an irregular, acircular surface against the outside of tube 28. The hexagonally-arranged sets of projections grip the corresponding indentations in the tube 28 as a nut is gripped by a wrench, preventing relative rotation of the nipple on the tube when nut 36 is tightened and loosened.

It should be pointed out that within the broader aspects of the invention the projections 21 may be arranged other than hexagonally. They could for example also be disposed parallel to the longitudinal axis of bore 18 along its inside surfaces, as a series of lugs, either in a particular pattern or randomly. In fact, in the broadest aspects of the invention the presence of projections per se is not necessary, since a similar result may be obtained by using a fitting which defines an internal bore having a portion with an acircular cross section taken along a plane normal to the axis of the bore. Such a configuration will insure that the complementary expander will when seated hold the fitting against rotation about the tube, the expander being positioned to urge a portion of the tube outwardly against the acircular portion.

Referring once again to the preferred embodiment of the invention, the hexagonal annular grooves 26 and rings 27 (FIG. 12) enhance the seal between nipple 12 and tube 28. Expander 30 forces the soft metal of tube 28 deeply into the grooves and around the rings such that the outside of tube 28 conforms closely to the configuration of the grooves and rings. This eliminates the surface irregularities on the outside of tube 28 created by the extrusion process by which such tubes are normally made. Therefore, the surfaces of enlarged portion 22 conform very closely to the outside surfaces of the expanded portion 29 of tube 28, effecting an air-tight seal.

Expander 30 has a generally tubular central portion 38 (FIGS. 9-11), the outer diameter of which is larger than the inside diameter of tube 28 before swaging. One end of the tubular central portion 38 is preferably beveled at 40 to facilitate insertion of that end into the end of the unexpanded tube. The other end of tubular portion 38 has a radially outwardly projecting angular flange 42 which prevents expander 30 from being inserted too far into tube 28 and nipple 12. The outside diameter of flange 42 is nearly the same as the inside diameter of the enlarged bell portion 22 of nipple 12, located near the tip of its nose 16. This permits flange 42 to be received within enlarged cavity portion 22 such that the outside surface of flange 42 is flush against the forward edge of nose 16, as shown in FIG. 12.

Expander 30 should be made of material which is at least slightly harder than the material from which tube 28 is made. For example, expander member 30 can be made from brass and tube 28 can be conventional soft copper tubing. Nipple 12 should also be made from a harder material than tube 28. If tube 28 is a soft copper alloy, for instance, nipple 12 can be made from brass. This permits the outside surfaces of tube 28 to be impressed or embossed by projections 24 and cold-flowed into grooves 26 and around rings 27.

The fitting of the present invention can be manufactured by use of conventional techniques. The nipple can be cast or machined in an ordinary fashion and bore 18 can be drilled therethrough. The enlarged or belled cavity portion 22 is machined into bore 18, as are the annular grooves in the inside of the enlarged portion 22, as by use of a conventional screw machine.

Two of the grooves correspond to grooves 26. The other two grooves are preferably broached with a hexagonal broach to create projections 24, the hexagonal broach being forced into the enlarged cavity portion 22 to a depth such that only the first two grooves are broached, creating the two sets of hexagonal projections.

A length of tubing 28 is then clamped by a rigidly supported hydraulic clamp such that at least two inches of the tube are held within the clamp leaving the end of the tube protruding out of the clamp. The clamp has two clamping halves which meet from a bore to receive the tube, the bore having a diameter slightly smaller than the outer diameter of the tube to hold the tube securely.

The nipple is then placed on the end of the tube protruding out of the clamp. The end of the tube should be about flush with the end of nose 16 of nipple 12, and the end of shank 18 should rest on the rigidly supported clamp. A bullet shaped steel mandrel having an outside diameter about the same as the inside diameter of bore 32 of expander 30 is inserted into bore 32. The length of the mandrel should be slightly longer than the length of bore 32 such that the bullet-shaped end of the mandrel projects beyond the beveled end 40 of expander 30. The mandrel is operably connected to a hydraulic unit. The hydraulic cylinder in the unit rams the mandrel and expander member into the end of tube 28 as it rests within nose 16.

As the expander member is forced into the end of tube 28, the bullet end of the mandrel and the beveled end of the expander member force the end of the tube outwardly against the belled cavity portion 22 of nipple 12. The expander is forced into the enlarged cavity portion 22 until flange 42 is substantially flush with the end of nose 16, as shown in FIGS. 1 and 12.

Since the end of tube 28 is flush with the end of nose 16 before expander 30 is inserted in tube 28, the end of tube 28 is forced radially outward and compressed at 44 (FIG. 12) into an annular recess 46 as the tube is expanded outwardly against the inside surfaces of enlarged cavity 22. Some of this compression allows material from tube 28 to flow into grooves 26 and around the projections 24. Much of this compression, however, takes place between flange 42 and the set of projections 24 closer to the end of nose 16. The compression in recess 46 between flange 42 and the first set of projections 24 causes a portion of the tube to form a lip 44 between flange 42 and the first set of projections. The material forming this lip as well as the material which flows into and between grooves 26 prevent tube 28 from being pulled out of bore 18. As indicated above, projections 24 prevent tube 28 from being rotated within bore 18 and thereby impairing or ruining the air-tight seal created between tube 28 and nipple 12 by the swaging action of expander member 30.

Once expander member 30 is inserted into tube 28, it remains there permanently. However, the bullet-shaped mandrel is withdrawn. The bore 32 in expander 30 has roughly the same inside diameter as the inside diameter of tube 28, permitting gas to flow substantially unhindered through tube 28 out of expander 30 and into the fitting to which nipple 12 is connected.

Since the pigtail connector 10 of the present invention can be made with conventional, inexpensive equipment, it can be seen that existing operations can be converted easily to the production of the pigtail connector of the present invention. Furthermore, the energy-intensive soldering operation characterizing all previous commercial products of this nature is eliminated, and no cleaning step is required after manufacture. The entire operation is much more economical than the soldering operation heretofore practiced. Thus, a successful and economical manufacture mechanical connection between the nipple and tube for high pressure applications has been made feasible for the first time.

As previously indicated, it is to be understood that the details of the above disclosure merely show a preferred embodiment of the invention, and that various changes and alterations may be made without departing from the spirit and broader aspects of the invention.

The embodiment of the invention in which an exclusive property or privilege is claimed are defined as follows:

1. A flow-through fitting for fluid-conveying tubing, and mechanical fastener means for coupling such fitting and tubing together in leak-proof relation, comprising in combination:

a flow-through fitting member having an axially-extending internal passage therethrough of a diameter to receive an end of said tubing, said passage having peripheral walls along at least part of its axial extent which define a recess of acircular cross section disposed generally transversely across the axis of said passage, said acircular recess having at least portions with a larger effective diameter than other portions of said passage which receive said tubing;

a wedge-type expander member insertable into said tubing received in said passage, said expander member having an outer size and shape configured to swage and expand portions of said tubing radially outwardly, and at least certain of said swaged and expanded portions entering said acircular recess as the expander member moves progressively into the tubing;

said swaged and expanded portions of said tubing and said expander member comprising mechanical fastening means securing said fitting member to the end of the tubing with a fluid-tight connection which permits axial flow of fluid through the tubing and the fitting member while also resisting subsequent loosening due to axial and rotational forces applied to the tubing and/or the fitting member;

said internal passage of said fitting member having at least one generally annular groove-like diametral enlargement along its length against which a portion of said tubing is swaged by said expander member to at least effect a fluid-tight seal between said tubing and said fitting member;

said fitting member including at least two internal projections said projections extending inwardly into said acircular portion of said passage, said projections engaging the outer periphery of said tubing when the same is swaged outwardly into said acircular recess, whereby the outside of said tubing is forced into conformation with the configuration of said projections; and said internal projections being disposed within said fitting member passage such that at least a portion of said passage has a polygonal cross section in a plane transverse to the axis of said passage at the point where said projections are positioned, said polygonal cross section defining said acircular portion at least in part.

2. The fitting as recited in claim 1 and including at least two sets of said projections, each spaced axially along said passage with respect to the other.

3. The fitting as recited in claim 2 wherein each of said two sets of projections defines a polygonal cross section which is hexagonal in configuration.

4. The fitting as recited in claim 3 wherein said fitting member is a nipple which includes a shank portion and a nose portion, said acircular bore portion being located in said nose portion.

5. The fitting as recited in claim 4 wherein said expander member includes a tubular portion having a beveled edge at one end and a radially-extending flange spaced axially along said tubular portion from said one end.

6. The fitting as recited in claim 5 wherein said beveledged end of said expander member is insertable sufficiently far into said tubing and said fitting member passage has a sufficiently large diameter in said nose portion that said radially-extending flange is positioned substantially flush with the end of said nose portion when said expander member tubular portion is fully inserted into said tubing.

7. The fitting as recited in claim 2 wherein said expander member has sufficiently large exterior dimensions that it forces the outside periphery of the end portion of said tubing against said projections and into said diametral enlargement, whereby the outside of said tubing is cold-flowed into a configuration complementary to that of the inside of said acircular portion and a gas-tight seal is created between said fitting member and said tubing.

8. The fitting as recited in claim 7 wherein said passage is provided with an annular recess between said first set of projections and the end of said tubing into which said expander member is inserted, whereby a portion of the end of said tube positioned in said passage is cold-flowed outwardly to form a lip within said annular recess as said tube is swaged diametrically outward against the inside of said passage by said expander member.

9. A gas pigtail connector comprising:
a fitting member having a bore therethrough, said bore having a relatively narrow-diameter portion and an enlarged-diameter portion, at least a part of said enlarged-diameter portion having an acircular cross section in a plane passing through the axis of said bore;

a tube having an outer diameter of generally the same size as that of the said narrow-diameter portion of said bore so as to be insertabe thereinto, said tube being disposed within said narrow-diameter portion of said bore and having at least a portion of said tube positioned inside said enlarged-diameter portion;

an expander member having a central passage therethrough, said expander member having at least certain exterior cross-sectional dimensions larger than the inside diameter of said tube and being inserted axially into said tube such that a portion of said tube is expanded outwardly into and tightly against said acircular portion, said expander member being generally aligned with and disposed in flow communication with the interior of said tube for continuing fluid passage through each;

said enlarged-diameter portion of said bore having at least a pair of generally annular grooves extending thereabout, said grooves spaced from one another along the axis of the bore, and forming an annular land disposed within said bore between said spaced grooves, said expander member having sufficient length and exterior size to force portions of the outside of said tube into said groove; and said acircular portion comprising a generally polygonal region within said enlarged-diameter bore portion and spaced along the axis of said bore portion from said annular grooves constituting said pair thereof, said tube having portions of its outer periphery forced into complementary engagement with said polygonal region and with said annular grooves to interlock the tube and fitting member together.

10. The pigtail connector as recited in claim 9 wherein said polygonal region disposed within said bore comprises a broached polygonal deformation of said bore forming a diametral enlargement thereof located in a plane generally normal to the axis of said bore.

11. The pigtail connector as recited in claim 10 and including at least a pair of said polygonal regions, each spaced from the other and from said annular grooves along the axis of said bore.

12. The pigtail connector as recited in claim 11, wherein said enlarged-diameter bore portion has an anchoring and sealing annular groove disposed adjacent the end extremity of the fitting member located proximate the end extremity of the tube, and wherein said pair of mutually-spaced polygonal regions are disposed axially inwardly from said fitting member end extremity along said bore portion thereof with respect to said anchoring and sealing groove, said anchoring and sealing groove having a larger effective diameter than that of said polygonal regions.

* * * * *